Patented Apr. 16, 1946

2,398,358

UNITED STATES PATENT OFFICE 2,398,358

CHROMABLE DYESTUFFS AND A PROCESS OF MAKING SAME

Achille Conzetti and Guido Schetty, Basel, Switzerland, assignors to J. R. Geigy A. G., Basel, Switzerland, a Swiss firm No Drawing. Application December 20, 1943, Serial No. 515,026. In Switzerland December 23, 1942

10 Claims. (Cl. 260—196)

We have found that new valuable chromable dyestuffs are obtained by coupling diazotised 2-aminophenol-4-phenylketone-3'-sulfonic acid or substitution products thereof with 2-aminonaphthalene-3-carboxylic acid. The new dyestuffs dye wool from an acid bath in red shades and, when after-chromed, in yellowish-green shades. The equal dyeings are distinguished by very good fastness properties to fulling, alkali and light.

The present invention will now be illustrated by the following example without being limited thereto. The parts are by weight.

Example 29.3 parts of 2-aminophenol-4-phenylketone-3'-sulfonic acid are dissolved neutral in 150 parts of water by means of 5.4 parts of anhydrous sodium carbonate, then treated with 6.9 parts of sodium nitrite and the clear solution is poured into 13 parts of concentrated hydrochloric acid which has previously been diluted by means of 30 parts of water. After completion of the diazotation the excess acid is neutralised by means of sodium bicarbonate, whereupon the clear yellow solution of the diazo compound is caused to flow, while stirring, into a solution of 21.4 parts of the sodium salt of the 2-aminonaphthalene-3-carboxylic acid in 300 parts of water. Stirring is continued at room temperature, until the dyestuff formation is completed. Then the dyestuff is precipitated by saturation with common salt. When pressed and dried it constitutes a brown powder dissolving in water with a red coloration and in concentrated sulfuric acid with a violet-red coloration. This new dyestuff dyes wool, when after-chromed, in yellowish-green shades of very good fastness properties.

If 2-aminophenol-4-(4'-chlorophenyl)-ketone-3'-sulfonic acid is used as diazo component, a dyestuff is obtained which is a brown powder dissolving in water with a red coloration. This dyestuff dyes wool in red shades and, when after-chromed, in yellowish-green shades of very good fastness properties.

On the other hand, when 2-aminophenol-4-(4'-methylphenyl)-ketone-3'-sulfonic acid is used, a dyestuff is obtained which is a brown powder dissolving in water with a red coloration and dyeing wool in red shades and, when after-chromed, in yellowish-green shades of very good fastness properties.

As further diazo components which may be used according to this invention may be mentioned 2-aminophenol-4-(4'-methoxyphenyl)-ketone-3'-sulfonic acid, 2-aminophenol-4-(4'-ethoxy- or 4'-propoxyphenyl)-ketone-3'-sulfonic acid and 5- or 6-chloro-2-aminophenol-4-phenyl-ketone-3'-sulfonic acid.

What we claim is:

1. Process for the manufacture of chromable dyestuffs which comprises coupling a diazotised compound of the general formula

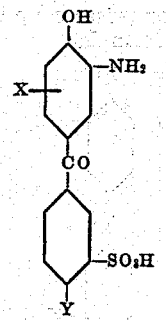

wherein X means a member of the group consisting of H and Cl and Y represents a member of the group consisting of H, Cl, CH₃ and O.alkyl, alkyl being a low alkyl radical, with 2-aminonaphthalene-3-carboxylic acid.

2. Process for the manufacture of chromable dyestuffs which comprises coupling a diazotised compound of the general formula

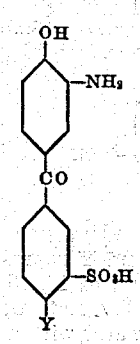

wherein Y means a member of the group consisting of H, Cl, CH₃ and O.alkyl, alkyl being a low alkyl radical, with 2-aminonaphthalene-3-carboxylic acid.

3. Process for the manufacture of a chromable dyestuff which comprises coupling the diazotised compound of the formula

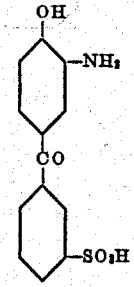

with 2-aminonaphthalene-3-carboxylic acid.

4. Process for the manufacture of a chromable dyestuff which comprises coupling the diazotised compound of the formula

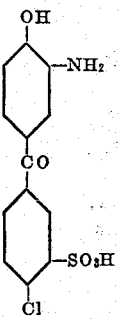

with 2-aminonaphthalene-3-carboxylic acid.

5. Process for the manufacture of a chromable dyestuff which comprises coupling the diazotised compound of the formula

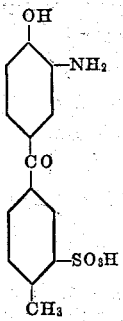

with 2-aminonaphthalene-3-carboxylic acid.

6. Dyestuffs of the formula

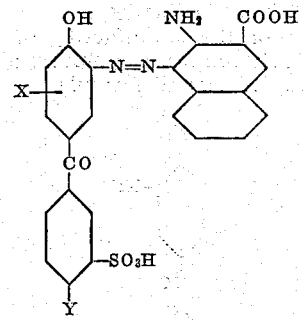

wherein X means a member of the group consisting of H and Cl and Y represents a member of the group consisting of H, Cl, $CH_3$ and O.alkyl, alkyl being a low alkyl radical, being brown powders dissolving in water with a red coloration and dyeing wool, when after-chromed, in yellowish-green shades of very good fastness properties.

7. Dyestuffs of the formula

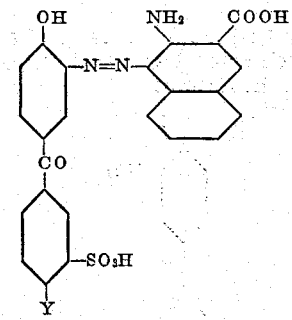

wherein Y means a member of the group consisting of H, Cl, $CH_3$ and O-alkyl, alkyl being a low alkyl radical, being brown powders dissolving in water with a red coloration and dyeing wool, when after-chromed, in yellowish-green shades of very good fastness properties.

8. The dyestuff of the formula

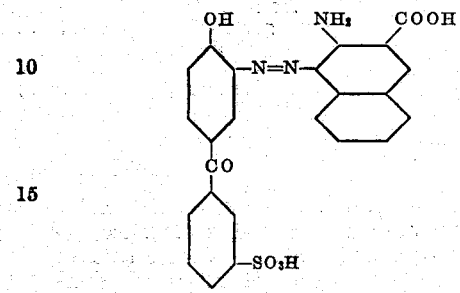

being a brown powder, dissolving in water with a red coloration and dyeing wool, when after-chromed, in yellowish-green shades of very good fastness properties.

9. The dyestuff of the formula

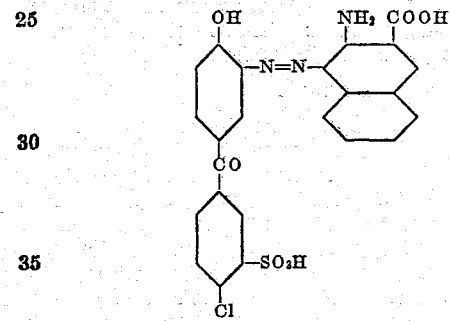

being a brown powder, dissolving in water with a red coloration and dyeing wool, when after-chromed, in yellowish-green shades of very good fastness properties.

10. The dyestuff of the formula

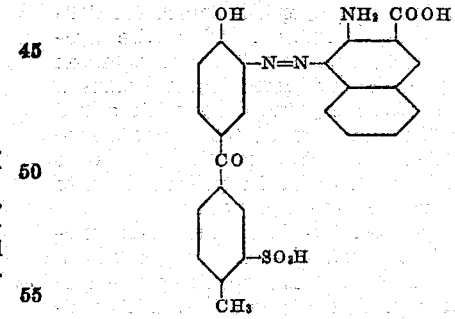

being a brown powder, dissolving in water with a red coloration and dyeing wool, when after-chromed, in yellowish-green shades of very good fastness properties.

ACHILLE CONZETTI.
GUIDO SCHETTY.